United States Patent [19]

Ahmad et al.

[11] Patent Number: 4,703,079
[45] Date of Patent: Oct. 27, 1987

[54] CUTTING AND CHIPPING RESISTANT TREAD FOR HEAVY SERVICE PNEUMATIC OFF-THE-ROAD TIRES

[75] Inventors: Shamim Ahmad, Canal Fulton; Zion S. Lee, Munroe Falls; Stephen E. Katrenick, Uniontown, all of Ohio

[73] Assignee: The B. F. Goodrich Company, New York, N.Y.

[21] Appl. No.: 722,482

[22] Filed: Apr. 12, 1985

[51] Int. Cl.$^4$ .......................... B60C 11/00; B60C 1/00
[52] U.S. Cl. ................................ 524/495; 152/209 R; 524/496
[58] Field of Search .................... 152/209 R; 524/495, 524/496

[56] References Cited

U.S. PATENT DOCUMENTS

| | | | |
|---|---|---|---|
| 4,154,277 | 5/1979 | Sato et al. | 152/209 R |
| 4,281,703 | 8/1981 | Ahmad | 152/209 R |
| 4,398,582 | 8/1983 | Yuto et al. | 152/209 R |
| 4,477,621 | 10/1984 | Sato et al. | 152/209 R |

*Primary Examiner*—Michael Ball
*Attorney, Agent, or Firm*—Harry F. Pepper, Jr.

[57] ABSTRACT

A pneumatic tire is produced for off-the-road use having a tread formed from a silica-free rubber tread compound consisting essentially of particular types of rubber, and at least 55 phr of a particular high structure, fine particle carbon black having a CTAB from 130–150 $m^2/g$, $N_2$ adsorption of 140–160 $m^2/g$, a tint of 125–140%, a DBPA of 120–140 ml/100 g, and a mean particle diameter of about 24 nanometers; and, from about 4 to about 8 phr of processing oil, antioxidant/antiozonants, curing agents and activators each present in an amount less than 10 phr. The result is a tire with substantially better cutting and chipping resistance than an identically produced tire with a tread containing silica in combination with a carbon black having essentially the same mean particle diameter but lower structure, without any noticeable loss in treadwear, or with an improvement in treadwear, that is, less loss due to treadwear.

4 Claims, 1 Drawing Figure

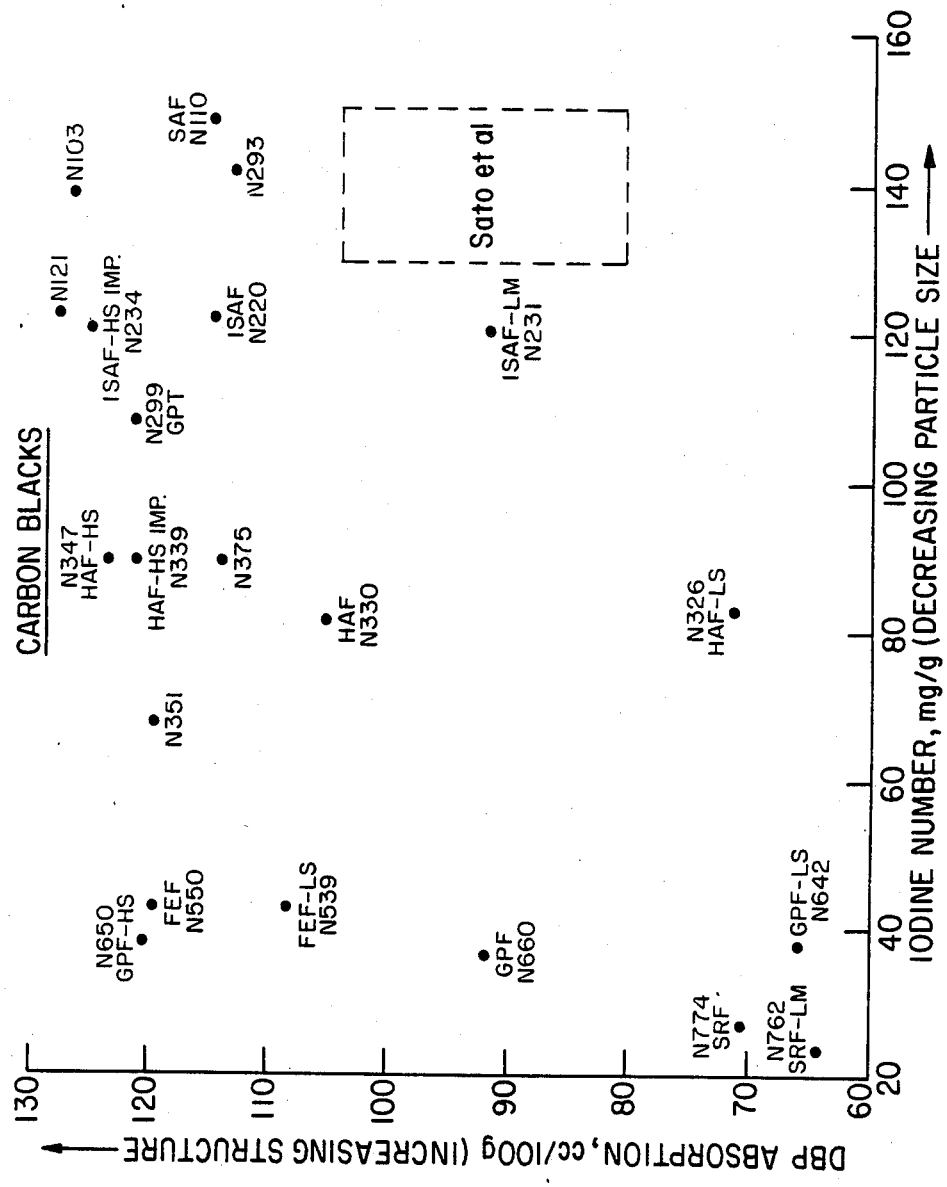

CUTTING AND CHIPPING RESISTANT TREAD FOR HEAVY SERVICE PNEUMATIC OFF-THE-ROAD TIRES

BACKGROUND OF THE INVENTION

This invention relates to relatively large pneumatic tires which are routinely subjected to severe cutting and chipping ("C & C" for brevity) during use, and more particularly to nylon-reinforced tires. Such large tires are used in off-the-road ("OTR") equipment such as tractors, graders, backhoes, front end loaders, etc., and trucks which serve locations not accessible by conventional concrete or asphalt highways.

Cutting takes place when the tire strikes a sharp object with enough force that the surface is penetrated or cut. Chipping can follow cutting by the effect of tractive, braking, or other forces on rough or sharp surfaces, causing tearing of the rubber compound, usually at 90° to the direction of the cut. Chunking is the tearing away of large chips. Cutting occurs suddenly and is unrelated to tearing; chipping is also relatively sudden but is related to tear strength. Neither cutting nor chipping is related to crack propagation which is a fatigue property.

Natural rubber (NR) has good C & C resistance but generally poor wear resistance, that is, tread wear. Styrene-butadiene-rubber (SBR) also has good C & C resistance but high heat build-up and easy crack propagation. Polybutadiene (PBD) does not propagate crack growth as readily as SBR but has poor C & C resistance. Therefore, PBD is generally avoided in recipes for heavy service OTR tread compounds.

More specifically, this invention is related to large tires having a silica-free tread which has excellent C & C resistance without undue heat build-up and without sacrificing abrasion resistance or tread wear.

Road tests conducted with tires treaded with tread compounds containing carbon blacks of low, normal and high structure showed that, of the properties tested, structure and dispersion of the black exerted greatest effect on abrasion resistance at high wear rates. At rates of wear more severe than 40 miles/mil, the high structure carbon blacks were superior to the normal structure blacks, but at lower severity the reinforcement depended more on particle size that on structure. Since large tires are generally expected to operate at relatively lower severity than 40 miles/mil, the emphasis has always been on particle size. See "Effect of Carbon Black Structure on Abrasion Resistance" by J. R. Haws, C. R. Wilder and W. T. Cooper, *Rubber Chemistry and Technology*, Vol 42, pg 1495-6 (1969). But good abrasion resistance was not correlatable with C & C resistance. In other words, some tread compounds with good abrasion resistance had unsatisfactory C & C resistance, others with good C & C resistance had unsatisfactory abrasion resistance, and it was difficult to formulate one which had both satisfactory abrasion and C & C resistance.

By "structure" we refer to the degree of fusion of particles into clusters called primary structure aggregates. Once the structure level is produced in the reactor it cannot be increased, but may be decreased by pelletizing or by mixing and processing carbon black compounds. When dibutylphthalate (DBP) is added to carbon black, it covers the surface and is strongly adsorbed into voids and gaps between attached particles. As DBP is added, the black goes from a free-flowing state to that of a paste with a progressive increase in viscosity. An absorptometer senses the changing viscosity and measures the volume of DBP needed to raise viscosity a fixed amount. The more oil required to cause a fixed viscosity increase, the more voids and attached particles and the higher the structure level.

One investigation compared the influence of curative level, total filler loading, adding channel black, silica (AS-100), and an oil, on laboratory C & C resistance. As expected, higher curative levels increased C & C, while higher levels of the other variables decreased them. The replacement of up to 10 phr (parts per 100 parts rubber) of the standard tread black, (PM-100, oil furnace black, USSR), with either channel black or silica produced significant improvement in C & C. See N. L. Sakhnovskii et al, *Kauch, Rezina* Vol 30(10) pg 30 (1971).

It has become common practice to improve the cutting and chipping resistance of heavy service tires for earth moving and mining equipment, and the like, by using blacks having fine particle sizes characterized by an Iodine No. or Iodine adsorbability (IA) of from 65-120, and high structure characterized by a DBP adsorption (DBPA) in the range from 115-120, and adding 10-25 phr of silica (HS-200) to a conventional tread compound, the more silica used the better the expected C & C resistance of the tread compound. OTR tires made by leading manufacturers of such tires in this country currently use up to 20 phr of silica (see Table I hereinbelow). However, silica contents in the higher range from about 20 to about 40 phr, increases heat build-up and causes tread separation. Increased silica content also decreases tread wear. To counter a proclivity for tread separation and the decreased tread wear, high structure carbon blacks are used, but structure has only a minor influence on abrasion resistance as severity decreases. But, we use no silica.

It is known that commonly used tread blacks cannot improve both the C & C resistance and wear resistance of rubber, but they will be improved by a particular black having an IA of 130-150 mg/g, a DBPA of 80-105 ml/100 g, and a tinting strength ("tint") of at least 240%, as is disclosed in U.S. Pat. No. 4,154,277 to Sato et al. It is specifically stated there that a black having a DBPA less than 80 ml/100 g lowers the Young's modulus and wear resistance of rubber, while one having a DBPA of more than 105 ml/100 g lowers noticeably the chipping resistance of rubber. Further disclosed therein is that only up to 70% by wt natural rubber (NR) and/or synthetic polyisoprene rubber (IR), the remainder being styrene-butadiene rubber (SBR), may be used, because SBR has poor resistance against heat build up and requires a large amount of processing oil. Yet, we use a high structure black; and, no silica.

The low structure black of Sato et al contributes to its relatively poor cutting resistance, compared to a standard SAF black (see Table 1 of the '277 patent). Superior cutting resistance is of critical importance in an OTR tire since it is difficult to negate crack propagation once the cuts are made. Sato et al's black also contributes to relatively poor tread wear, though this is not apparent in their Table 1. They did not realize that a high structure carbon black could provide excellent C & C resistance without any worse tread wear than obtained with a silica-containing, or low structure black-containing tread.

The low structure, fine particle black of the '277 patent is not known to be generally available commercially, but N293 is available which has a DBPA in the range 80–105 and an IA in the range 135–155, which values correspond to those of the '277 black. When N293 is substituted for the N103 black in the tread of an OTR tire, its performance relative to C & C resistance and tread wear is comparatively unsatisfactory.

More recently, the effect of reinforcing carbon black type, i.e. FEF, HAF, ISAF and SAF, was evaluated in the same NR recipe, inter alia. The C & C results were determined and tabulated in an article titled "A Laboratory Cutting and Chipping Tester for Evaluating Off-The-Road and Heavy-Duty Tire Treads" by J. R. Beatty and J. Miksch, *Rubber Chem. Technol.* pg 1531–46 Vol 55, No. 5 (1982). In Table VIII of the article are tabulated several blacks, and among those having essentially the same CTAB values (cetyltrimethylammonium bromide adsorption provides a measure of surface area correlatable with particle size) but differing structure, it is evident that there is no correlation between structure and C & C resistance. Among those blacks with a large variation in particle sizes, both C & C resistance and abrasion resistance improve with decreasing particle size (see FIG. 11); however, among those blacks with approximately the same fine particle sizes CTAB 113–116, or 121 there is no correlation of particle size with the level of C & C resistance. It is acknowledged that blacks in the 400 series are too large for satisfactory use in OTR tire treads.

SUMMARY OF THE INVENTION

It has been discovered that excellent cutting and chipping ("C & C" for brevity) resistance can be obtained without sacrificing tread wear in heavy service pneumatic tires with a predominantly natural rubber or synthetic polyisoprene tread compound, without the use of silica, provided that a particular high structure carbon black, recently designated N103, having a DBPA greater than 120 ml/100 g, is used in the recipe for the tread compound.

It is therefore a general object of this invention to provide off-the-road ("OTR") vehicles including trucks with tires having a silica-free tread compound comprising more than 50 parts by weight (wt) natural rubber, or polyisoprene; from about 3 to less than 20 parts by weight processing oil; and, from 55 to about 70 parts by wt of a high structure N103 carbon black having the following critical properties: a surface area measured by CTAB and electron microscope surface area (EMSA) test procedures, in the range from 130 to about 150 m$^2$/g, and from 140 to about 160 m$^2$/g, respectively; tint in the range from about 125% to about 140%; and, a DBPA value in the range from 120–140 ml/100 g.

It is a specific object of this invention to provide a large heavy service tire with a silicia-free tread containing no more than 25 phr of SBR, the remaining rubber being either natural rubber or synthetic polyisoprene, which tread has excellent C & C resistance imparted to it by the presence of N103 black which has a DBPA of about 130 ml/100 g, and superfine particle size smaller than 25 nonometers (nm).

BRIEF DESCRIPTION OF THE DRAWINGS

The foregoing and other objects and advantages of our invention will appear more fully from the following description, made in connection with the accompanying FIGURE (chart) in which various carbon blacks are placed according to their DBPA and IA values.

DETAILED DESCRIPTION OF PREFERRED EMBODIMENTS

In its most preferred embodiment this invention relates to nylon-cord reinforced heavy service tires where C & C resistance with satisfactory tread wear is of critical importance. Such tires are disclosed in U.S. Pat. Nos. 3,547,175 to H. Verdier; 3,620,867 to D. R. Bartley; 3,880,218 to S. Barjenovich, inter alia, the construction of which are conventional, and the disclosures of which are incorporated by reference thereto as if fully set forth herein. The expense of each of such tires is so great as to make it essential that they provide reliable service on vehicles used in rugged tasks for a period long enough to justify their high cost. The C & C resistance of treads for such tires is first tested in the laboratory using an apparatus such as is disclosed in U.S. Pat. No. 4,144,740, then tested in the field.

A particular pneumatic heavy service OTR tire is constructed with nylon cord-reinforced belts and a silica-free tread made from a major proportion of natural rubber (NR) or synthetic polyisoprene (IR), more preferably at least 75% by wt, the remaining rubber being SBR. The material of the cords is not critical, and other commonly used cords such as glass fiber, steel, polyester, aramid and rayon cords may also be used.

The N103 carbon black has a tint, measured as in the '277 patent, of 260–290%; a primary particle size in the range from 10 to 20 nm; and an $I_2$ No. or IA in the range from 130–160 mg/g (mg of iodine per gm of black); more particularly, a CTAB from 130–150 m$^2$/g, an EMSA from 140–160 m$^2$/g, and a DBPA from 120–140 ml/100 g, which ranges are critical in the formulation of the tread compound.

This N103 black was found to have a unique surface activity attributable to the volatiles and/or extractable material on its high surface area. These volatiles in turn, block adsorption of iodine, as can such oxygen as may be present, and are regarded herein as contaminants which appear to be closely related to the total history of the black and the process by which it is produced. Thus, the IA value is not as meaningful as the CTAB and EMSA values as a measure of surface area, and the correlatable particle size.

A nylon cord-reinforced tire having a tread made from a tread compound utilizing the N103 black, and other ingredients as specified herein, exhibits better C & C resistance than conventional silica-containing treads with conventional high structure blacks, no loss of tread wear and no ply separation due to heat build-up. Despite a low processing oil content, generally from 3–10 phr, the tread compound has satisfactory processability. The foregoing properties of the tire give it remarkable durability under severe conditions and, as a result, commercially significant marketability.

DBPA is measured in accordance with the procedure set forth in ASTM D-2414-70 which is incorporated by reference thereto as if fully set forth herein. DBP is added to a pelleted black until a transition occurs from a free-flowing powder to a semi-plastic agglomerate.

EMSA is measured as described in greater detail in an article titled "Modern Methods of Particle Analysis" by D. W. Montgomery, *Rubber Age* Vol. 94 759 (1964), by measuring the particle size with an electron microscope; and, thereafter measuring surface area in an article titled "Characterization of Pigments and Carbon Black" by L. L. Ban and W. M. Hess, *Rubber Chem. Technol.* Vol.

47 858 (1974), the disclosures of which articles set incorporated by reference thereto as if fully set forth herein.

IA, also referred to as Iodine No., is determined by the amount (mg) of iodine adsorbed on 1 g of black in a dry state in accordance with the standard procedure.

CTAB is a large molecule which is adsorbed on the black excluding small interstices and represents the portion of surface area that comes into contact with rubber polymers. BET nitrogen adsorption also provides a measure of surface area because the gas completely covers the black's surface including microscopic pores.

Tint represents the relative covering power of a pelletized black in zinc oxide in a weight ratio of 1:37.5, dispersed in an epoxidized soybean oil type plasticizer and compared to a series of standard reference blacks tested under the same conditions, as set forth in detail in the '774 patent and incorporated herein by reference thereto. The tint measured in the '277 patent is on a different basis. A measure of each of the properties, namely EMSA, CTAB, $N_2$ adsorption, tint and DBPA provide a more reliable determination of surface areas of a black.

C & C resistance is measured by diameter reduction as set forth in the Beatty et al article, supra, or by the Cabot cutting and chipping test.

The amount of N103 black in the tread of the tire of this invention ranges from about 60 phr to about 80 phr, more preferably from about 55 to about 70 phr.

The rubbers which provide excellent C & C resistance when reinforced with the high structure N103 black and NR and/or IR, and optionally SBR, provided the SBR is present in a minor amount, no mpore than 25 phr, relative to the other rubbers. A small portion, up to 20% of the NR may be chlorinated. The SBR is preferably formed from copolymers of from about 20 to about 40 parts by wt of styrene, and from about 80 to about 60 parts by wt of butadiene.

The effect of HS-200 (Hi Sil 210) on tread wear in OTR tires is given in an article titled "Fine-Particle Silicas in Tire Treads, Carcass and Steel-Belt Skim" by M. P. Wagner, *Rubber Chem. Technol.* 50, 356–63 at pg 360 in Table III (1977). It is stated therein that cutting/chipping is rated "4" for a NR tread with 60 phr N231 black, but is rated "1" when 30 phr of the N231 black is substituted with 30 phr of HS-200 silica and a coupling agent for the silica. The rating scale is based on severe cutting/chipping being "5", and very slight damage being "1".

For evaluating the C & C resistance and tread wear of various tires with varying levels of N103, and processing oil, all tires tested were made from NR only and included sufficient levels of antioxidant and antiozonant, activators and curing agents to provide the desired cure. The invention will be more readily understood by reference to the following examples which compare the C & C resistance and tread wear characteristics of conventional heavy service tires containing silica, prior art high structure blacks, and the N103 black. The examples exemplify the use of N103 black with a critical difference in structure as measured by the DBPA, CTAB and EMSA values compared with prior art fine particle blacks, and the unexpected effects of that difference.

In the following Table I are tabulated the analyses for typical OTR tires manufactured by major manufacturers, all of which tires include silica (assumed to be HS-200 or its equivalent) in the tread compounds, and the OTR tire of this invention to be manufactured without silica. The values of DBPA, IA and CTAB given are those for a typical N351 or N220 black and not the specific black used in the tire, since the particular values for the black used in the tire cannot be obtained by analyses. The proportions set forth may vary ±2 phr from sample to sample.

TABLE I

CARBON BLACK AND SILICA CONTENT OF OTR TIRES

| Manufacturer Black, | | phr | DBPA | IA | CTAB | Silica | phr |
|---|---|---|---|---|---|---|---|
| Bridgestone | N351 | 45 | 120 | 65 | 74 | HS-200 | 10 |
| Firestone | N351 | 42 | 120 | 65 | 74 | HS-200 | 20 |
| General | N351 | 45 | 120 | 65 | 74 | HS-200 | 15 |
| Goodyear | N220 | 40 | 115 | 120 | 111 | HS-200 | 19 |
| This invention | N103 | 60 | 130 | 140 | 130–150 | none | 0 |

In the following Table II are tabulated esential physical characteristics of fine particle N103, N110, N220 and N351 tread blacks, along with the typical Hi-Sil used in tread compounds. The given mean particle diameter of Hi-Sil is approximate.

TABLE II

CHARACTERISTICS OF TREAD BLACKS

| Filler | CTAB ($m^2/g$) | $N_2$ Adsorp. ($m^2/g$) | Tint % | DBPA (ml/100 g) | Mean part. diam. (nm) |
|---|---|---|---|---|---|
| N110 | 126 | 143 | 111–113 | 106–116 | 26.4 |
| N220 | 111 | 119 | 110–120 | 106–116 | 29.3 |
| N293 | 114 | 130 | 117 | 100 | 30. |
| N351 | 74 | 73 | 100 | 120 | 35. |
| N103 | 130–150 | 140–160 | 125–140 | 120–140 | 23.9 |
| Hi-Sil | | 130 | | | 28. |

Referring to the appended drawing, there is shown a chart in which DBPA is plotted against IA for a variety of carbon blacks, to provide a visual picture of the relatively narrow range of particle size (high IA) to which effective tread blacks are confined. Since no specific black which meets the criteria set forth in Sato et al is commercially available, so that particular characteristics do not permit it to be represented by a point on the chart, a dashed rectangle is used to delineate the boundaries for those characteristics deemed desirable by them.

EXAMPLE 1

A tread compound consisting essentially of 100 parts NR, 60 parts of N103 tread black, 4 phr processing oil, 4.75 phr antioxidant/antiozonant compounds, 3.45 phr curing agents and 5.5 phr activators and other materials such as zinc oxide, sulfur, stearic acid and the like which are conventionally used, is prepared to form the cap tread on an OTR tire designated 11.00×22/14PR BFGoodrich High Tread Logger used on coal hauling trucks in coal mines. Another identical tire is built except that the cap tread is made with a conventional OTR tread compound the details of which are specified in Table III herebelow, and cured under normal conditions for this tire with the conventional compound. The conventional and novel OTR tires are then tested in simulated actual service on a coal hauling truck run on a rock test strip course, and the C & C resistance and tread wear of the tires are monitored.

The same conventional and novel OTR tire tread compounds are prepared as test specimens which are cured under conditions corresponding to the curing of the OTR tires, and the test specimens are tested for C & C resistance by the Beatty et al testing procedure. A tire is also tested under the Cabot testing procedure.

TABLE III

| | OTR Tread Composition* | | |
|---|---|---|---|
| | Conventional | This Invention | |
| Rubber | 100 (NR) | 100 (NR) | 75 (IR) |
| | | | 25 (SBR) |
| Carbon black | 40 (SAF) | 60 (N103) | 65 (N103) |
| Silica (Hi-Sil 210) | 15 | — | — |
| Processing Oil | 4 | 4 | 6 |
| Antioxidant/ antiozonant | 5.75 | 4.75 | 4.75 |
| Curing agents | 3.75 | 3.45 | 3.45 |
| Activators | 5.5 | 5.5 | 5.5 |

*all additives to rubber are given in phr.

A comparison of physical properties of conventional tread compounds and the NR tread compound containing N103 black is given in Table IV hereinbelow.

TABLE IV

| | Conventional | This invention |
|---|---|---|
| Stress/Strain @ R.T. | | |
| Tensile 30' @ 280° F. | 1725 | 3115 |
| 45' | 3830 | 3800 |
| 75' | 3715 | 3970 |
| 300% Modulus 30' | 380 | 1175 |
| 45' | 1955 | 2090 |
| 75' | 1960 | 2205 |
| % Elongation 30 | 665 | 595 |
| 45' | 515 | 505 |
| 75' | 490 | 505 |
| Hysterisis 17½% - 55# - 195° F. | | |
| Durometer | 65 | 66 |
| T° F. | 45 | 62 |
| % Perm. Set | 11.5 | 14.4 |
| Roelig 15% DFL - 158° F. | | |
| Loss Tangent | 0.1281 | 0.1790 |
| Dynamic Modulus | 5.34 | 5.90 |
| Loss Modulus | 0.68 | 1.04 |
| PE | 2.13 | 3.28 |
| PS | 0.0755 | 0.0953 |
| Pico Abrasion @ R.T. | | |
| Index | 113 | 125 |
| Die "B" Tear | | |
| @ R.T. | 705 | 850 |
| @ 212° F. | 455 | 505 |

The High Tread Logger tires were mounted on the drive wheels of a coal hauling truck, the conventional tire on one end of a drive axle, and the N103-containing tire on the other end of the drive axle. The tires were checked visually at the end of each week. The cutting resistance was measured separately from the chipping resistance by counting the number of cuts and chips separately and quantifying the severity of the damage. The conventional tire was then assigned 100 basis points, and the novel tire rated in comparison. The average of several tires is set forth hereinbelow in Table V.

TABLE V

| C & C RESISTANCE IN ACTUAL USE | | |
|---|---|---|
| | Conventional | This Invention |
| Cutting Resistance index | 100 | 135 |
| Chipping Resistance index | 100 | 145 |

C & C resistance was measured with the Cabot test procedure in which a 6.90×9 trailer tire retreaded with multiple sections (multisection tire) of tread is tested on a course of sharpened angle irons forming a long bed. The test tire is mounted on a travelling axle and the tire is run over the bed, back and forth, until severe damage is visible. The test is then interrupted to count the number of cuts and chips. The control section of NR tread with 40 phr SAF black and 15 phr Hi-Sil is assessed 100 basis points and the test section of tread is rated relative to this assessment.

The following test results were obtained after 200 cycles at room temperature.

TABLE VI

| CABOT C & C RESISTANCE TEST | | |
|---|---|---|
| | Conventional | This Invention |
| C & C resistance index | 100 | 160 |

The foregoing results show that the C & C resistance of the silica-free tread containing the N103 black was much superior to the tread section containing SAF black and Hi-Sil.

C & C resistance was also measured with the Beatty et al test procedure in which a 5 cm (nearly 2" diam.) disc is tested in a laboratory apparatus described in the Beatty et al article, supra. The results are set forth for an average tire in Table VI hereinbelow.

TABLE VII

| C & C Resistance (Beatty et al procedure) | | |
|---|---|---|
| | Diam. loss | Index |
| Conv. compound with SAF black & Hi-Sil | 0.39" | 100 |
| N103-containing silica-free compd. | 0.30" | 130 |
| Goodyear compd., N220 & Hi-Sil | 0.34" | 115 |

It is evident from the above data that the novel silica-free tires with N103 black are better in C & C resistance than the conventional tires with SAF black and Hi-Sil, and also better than the tires currently marketed by major manufacturers, a representative one being Goodyear.

Indoor Endurance tests were carried out on the High Tread Logger tires according to the directions set forth in DOT test 467 in which conventional tires were run along with tires of this invention, at specified load at 25 mph. Both the conventional and novel tires of this invention exceeded the minimum standard of 47 hr. After the 47 hr period, the load on the tires was increased progressively every 4 hr by 20% until the tires failed, usually either because of tread separation, or a carcass blowout. From the data set forth for the average tire in the following Table VI it is evident that the performance of both sets of tires was about equivalent.

TABLE VII

| Indoor Endurance Test | |
|---|---|
| Conventional Logger tire with SAF & Hi-Sil | 61.9 hr |
| N103-containing silica-free Logger tire | 59.8 hr |

Treadwear tests were conducted by mounting conventional 11×22/14PR OTR tires and novel similar tires which have treads containing N103 black and no silica, at opposite ends on drive axles of trucks loaded to provide a load of 6160 lbs per tire, each of which was inflated to 90 psi. The trucks were run at 35 mph on a prescribed course of paved asphalt highway, and the skid depth to the nearest 0.001" checked every 1200 miles. After the trucks have logged 18,000 miles a projection is made as to when the tread will be worn out. The results for an average conventional tire and an average novel tire are set forth in Table VIII herebelow, the conventional tire being assessed 100 basis points. It is evident that the treadwear on both sets of tires is about the same, the novel being slightly better.

TABLE VIII

| Treadwear test in actual use | Projected Wearout | |
|---|---|---|
| | Miles | Index |
| Logger OTR with SAF and Hi-Sil | 61,200 | 100 |
| Logger OTR with N103, no silica | 64,500 | 105 |

We claim:

1. A pneumatic tire for off-the-road use, said tire having a tread formed from a silica-free rubber tread compound consisting essentially of 100 parts by weight of a rubber selected from natural rubber, synthetic polyisoprene, and a blend of natural rubber with no more than 25 parts of styrene-butadiene-rubber for 100 parts by wt of total rubber, at least 55 phr of a high structure, fine particle carbon black, designated N103, having a CTAB from 130–150 $m^2/g$, $N_2$ adsorption of 140–160 $m^2/g$, a tint of 125–140%, a DBPA of 120–140 ml/100 g, and a mean particle diameter of about 24 nanometers; and, from about 4 to about 8 phr of processing oil, antioxidant/antiozonants, curing agents and activators each present in an amount less than 10 phr.

2. The pneumatic tire of claim 1 wherein said tread has substantially better cutting and chipping resistance than an identically produced tread containing silica in combination with a carbon black having essentially the same mean particle diameter but lower structure, with at least essentially the same treadwear.

3. The pneumatic tire of claim 1 wherein said tread has substantially better cutting and chipping resistance than an identically produced tread containing silica in combination with a carbon black having essentially the same structure but larger mean particle diameter, with at least essentially the same treadwear.

4. The pneumatic tire of claim 2 wherein said rubber is natural rubber, and said tread has a cutting and chipping resistance each at least 25% better than an identically produced tread containing silica in combination with a carbon black, when the comparison is made by visual examination of said tread after said tire is placed in service.

* * * * *